US006048208A

United States Patent [19]

Hoover

[11] Patent Number: 6,048,208

[45] Date of Patent: Apr. 11, 2000

[54] ELECTRICAL SERVICE SIMULATOR

[75] Inventor: Robert A. Hoover, Geneva, Ill.

[73] Assignee: Commonwealth Edison Company, Chicago, Ill.

[21] Appl. No.: 08/992,732

[22] Filed: Dec. 17, 1997

[51] Int. Cl.[7] ............................ G09B 19/00; G09B 23/18

[52] U.S. Cl. ............................................ 434/224; 434/226

[58] Field of Search .................................... 434/219, 224, 434/226, 301, 379, 365

[56] References Cited

U.S. PATENT DOCUMENTS 3,675,342 7/1972 Wolff .
4,213,253 7/1980 Gudelis et al. .
4,332,568 6/1982 Hyink ...................................... 434/224
5,067,901 11/1991 Fordham et al. ........................ 434/224
5,275,571 1/1994 Musto et al. .
5,444,907 8/1995 Becker .
5,752,835 5/1998 Whitmer, Sr. ........................... 434/226

*Primary Examiner*—Valencia Martin-Wallace
*Assistant Examiner*—Mark A. Sager
*Attorney, Agent, or Firm*—Brinks Hofer Gilson & Lione

[57] ABSTRACT

An electrical service simulator includes four hinged panels that are movable between a storage position and an operational position. In the storage position the panels are arranged as a rectangle, while in the operational position the panels provide a free-standing display of multiple electrical service fixtures such as electrical service meters. An electrical supply system is connected to some of the meter service fixtures to power the fixtures during a training exercise.

15 Claims, 3 Drawing Sheets

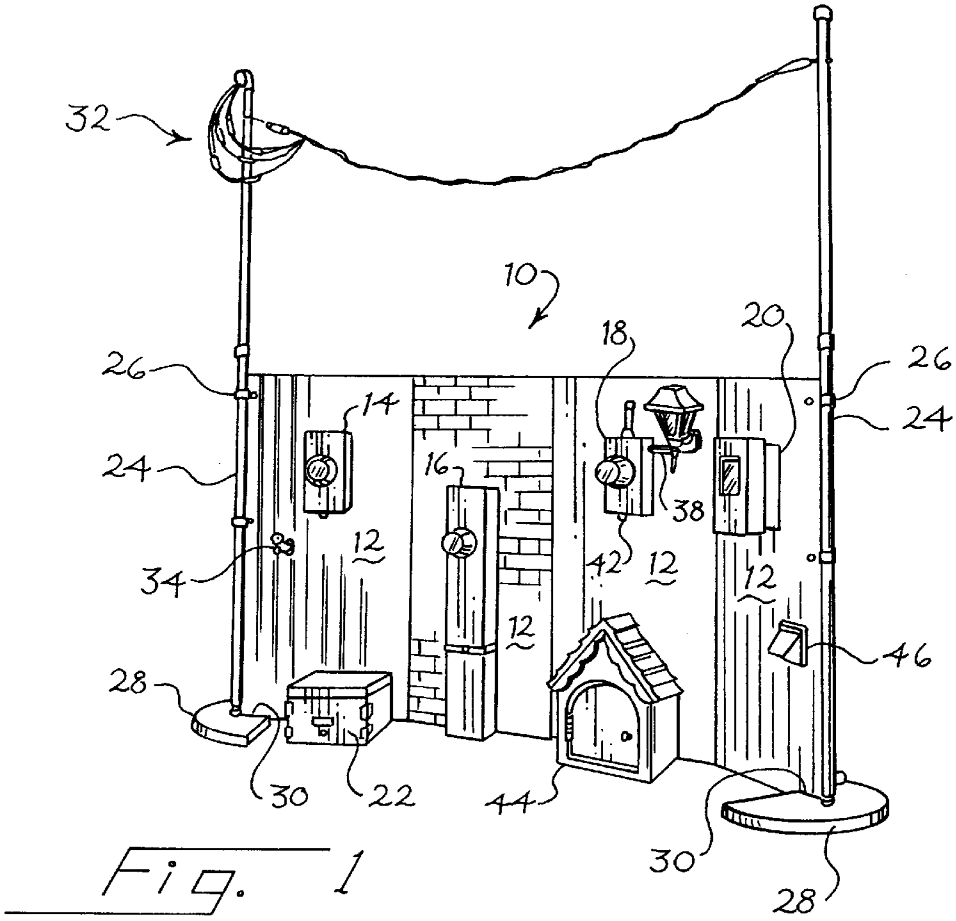
Fig. 1
Fig. 2
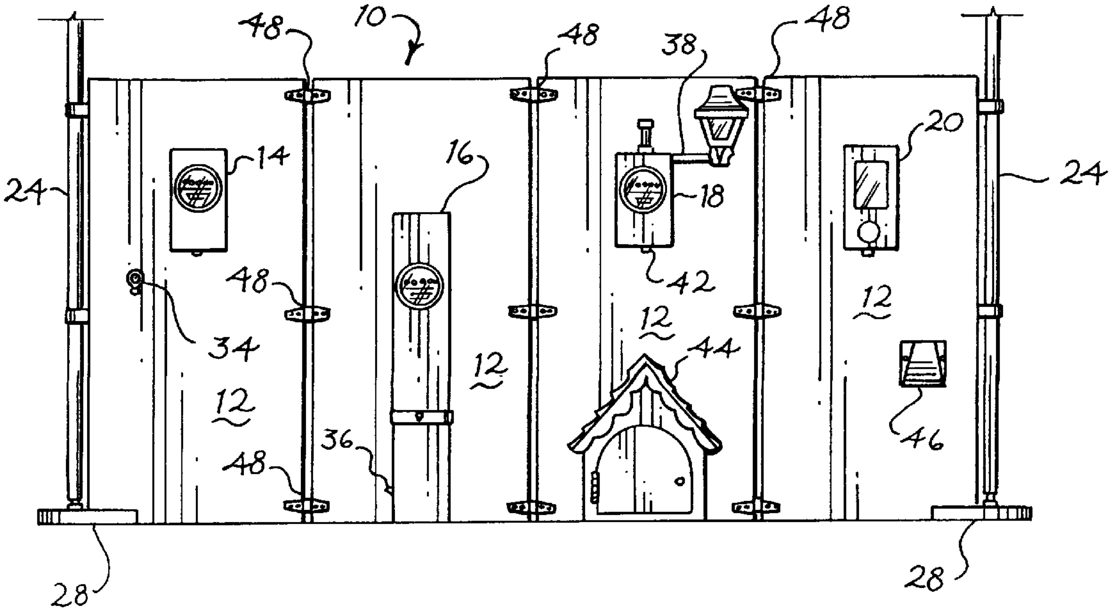

ELECTRICAL SERVICE SIMULATOR

BACKGROUND OF THE INVENTION

This invention relates to an electrical service simulator well suited for use in training exercises on proper technique for removing electrical power from a structure such as a residence.

In the event of a fire in a residence, there is often a need to remove electrical power from the residence to reduce electrical dangers to fire fighters. When possible, the preferred approach is for the electrical utility to disconnect power to the residence, typically at the electric meter, using trained personnel from the electrical utility.

On occasion, trained personnel from the electrical utility are not available when needed to remove electrical power from a residence. In this case, it is important for fire fighting personnel to be able to accomplish this task safely and reliably. In the past, electrical utilities have taken steps to train fire-fighting personnel in proper technique. However, a need exists for devices to facilitate this training.

SUMMARY OF THE INVENTION

The present invention is defined by the following claims, and nothing in this section should be taken as a limitation on those claims.

By way of introduction, it can be said here that the preferred electrical service simulator described below includes multiple interconnected panels which are movable between a storage position and an operational position. Electrical service fixtures such as various electrical service meters are mounted to the panels, and an electrical supply system is connected to at least some of the fixtures to power the fixtures during training exercises. The interconnected panels can be folded to the storage position in which the service simulator is easily transported, and the interconnected panels can be unfolded to the operational position, in which the service fixtures are positioned to provide a realistic simulation of conditions that trainees may encounter.

BRIEF DESCRIPTION OF THE DRAWINGS

FIG. 1 is a perspective view of an electrical service simulator in an operational position.

FIGS. 2 and 3 are front and rear views, respectively, of the service simulator of FIG. 1.

DETAILED DESCRIPTION OF THE PRESENTLY PREFERRED EMBODIMENTS

Figure 3:
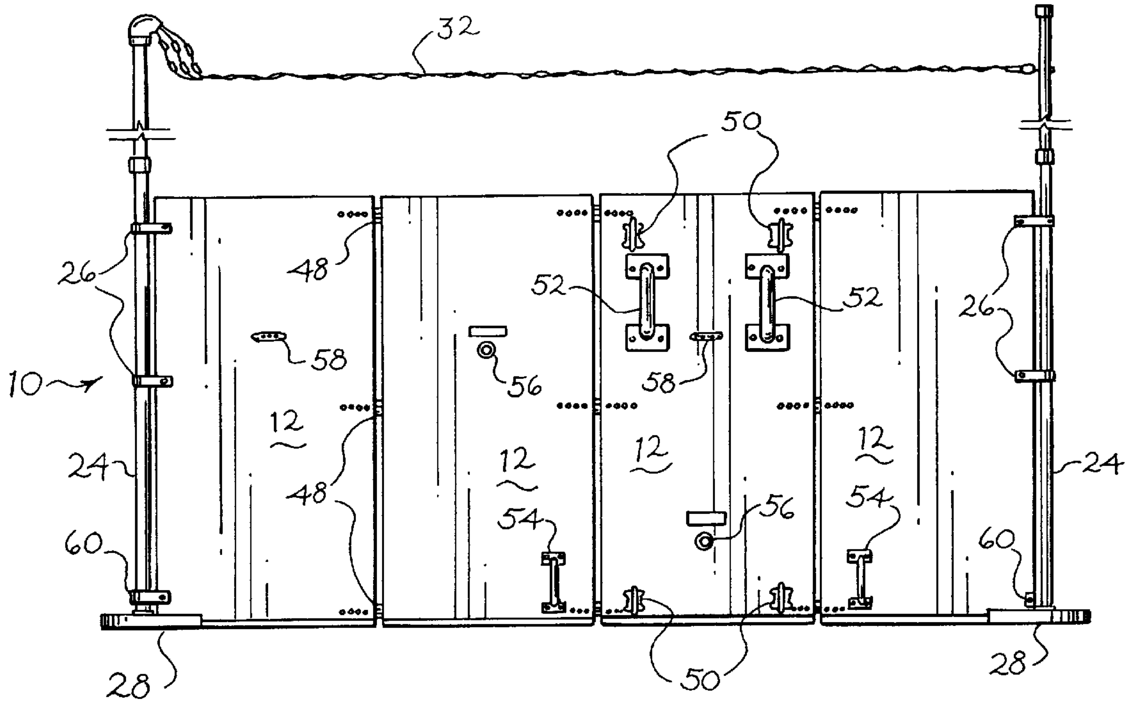

Turning now to the drawings, FIG. 1 shows a perspective view of a presently preferred embodiment of the electrical service simulator of this invention. The service simulator 10 of FIG. 1 includes four panels 12 that are hinged together as described in detail below. Each of the four panels supports a respective service fixture 14, 16, 18, 20, in this case various types of electrical service meters. At least some of the service fixtures 14, 16, 18, 20 are powered for more realistic simulation by electrical power supplied by a power supply 22 that is mounted in a separate enclosure.

Two vertical poles 24 are secured to opposite ends of the simulator 10 by means of straps 26 that are releasably held to the panels 12 by fasteners (in this example, wingnuts). The lower ends of the poles are releasably held in bases 28, and each of the bases defines a slot 30 shaped to receive an edge of a respective one of the panels 12. Thus the bases 28 provide added stability to the panels 12 when they are in the operational position shown in FIG. 1. A simulated electrical overhead service comprising three conductors 32 is stretched between the upper ends of the poles 24. The following discussion will describe the mechanical and then the electrical structure of the service simulator 10.

As shown in FIG. 2, the four panels 12 support four types of meter cabinets that are conventionally found in residential single phase service. The service fixture 14 in this embodiment is a ring-type meter cabinet such as that supplied by Superior Technologies as Meter Cabinet No. 6217. In order to enhance realism, the panel with the ring-type meter cabinet 14 also includes a water spigot 34.

The immediately adjacent panel 12 supports the service fixture 16, which in this embodiment is a meter cabinet suitable for use with underground cables, such as the meter cabinet sold by Milbank as Cabinet No. B4592. This meter cabinet has been modified by adding a single throw switch 36, which will be described in detail below.

The next panel 12 supports the service fixture 18, which in this embodiment is a meter cabinet of the type sold by Milbank as Cabinet No. B-4636. The service fixture 18 in this embodiment is electrically identical to the service fixture 14, but the mechanical mounting arrangement is somewhat different. The service fixture 18 is connected via cables in a conduit 38 to an electrical load such as a lamp 40. The service fixture 18 has been modified from a normal fixture by the addition of a single pole switch 42 to be described below. The panel that supports the service fixture 18 also supports a storage cabinet 44, which in this embodiment has been shaped as a dog house. The storage cabinet 44 includes a closable door, and it can be used to secure hardware useful in conducting a training session.

The right hand panel 12 supports yet another type of service meter, in this case an A-base meter cabinet 20. In order to make the simulation more realistic the right hand panel includes a dryer vent housing 46.

As shown in FIG. 2, adjacent ones of the panels 12 are secured together by hinges 48. Preferably, the hinges 48 are loose pin hinges, though any suitable hinge can be used.

FIG. 3 shows a rear view of the simulator 10, including the straps 26 used to releasably secure the poles 24 to the panels 12. As shown in FIG. 3, one of the panels supports four wheels 50, that in this embodiment are five inch dolly wheels. The panel supporting the wheels 50 also supports handles 52. The two adjacent panels 12 are also provided with handles 54. Also apparent in FIG. 3 are electrical sockets 56 that are used to transmit electrical power to the service fixtures on the central panels 12. Latches 58 are provided to secure an elastic band, as described below. A locking hasp 60 is mounted adjacent opposite ends of the service simulator 10 to hold the simulator 10 in a folded or storage position as described below.

Figures 4, 5:
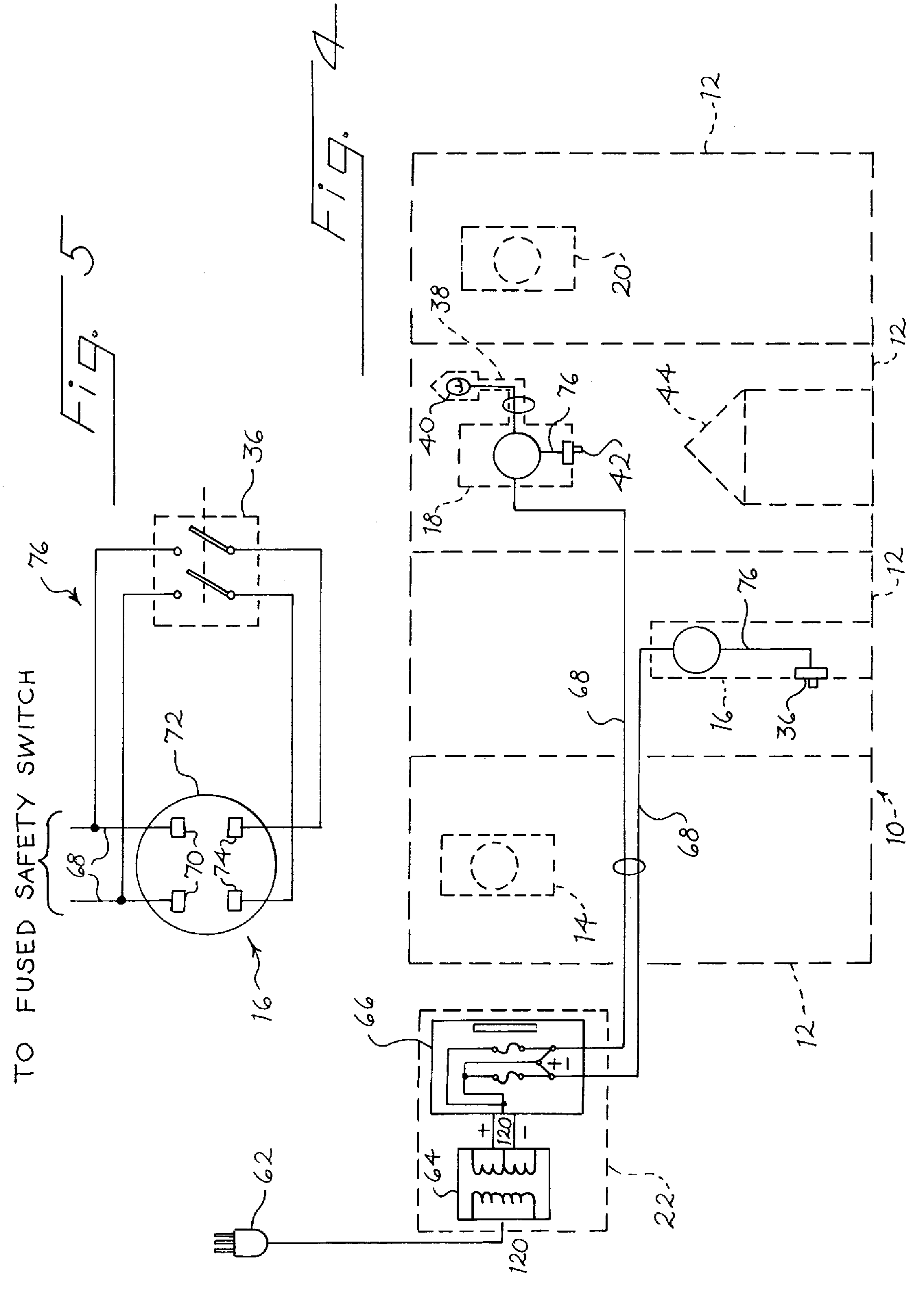
FIGS. 4 and 5 are electrical schematic diagrams of the service simulator of FIG. 1.

As shown in FIG. 4, the power supply 22 includes a plug 62 intended to be plugged into a conventional 120 volt outlet at the training site. The power supply 22 also includes a transformer 64 that converts the 120 input voltage into two 120 volt output voltages suitable for a conventional 240 volt service. The transformer 64 is connected by a fused safety switch 66 to a first electrical circuit 68 that provides electrical power to the bases for the electrical service meters included in the service fixtures 16 and 18. As shown in FIG. 4, the service fixtures 14 and 20 are left unpowered in this embodiment.

FIG. 5 shows a more detailed electrical schematic of the service fixture 16. The first electrical circuit 68 provides electrical power to a first pair of contacts 70 included in a meter base 72. These first contacts 70 are adapted to supply electrical power from the power supply 22 to the associated electrical service meter.

The meter base 72 also includes a second pair of contacts 74 that are adapted for connection to the subscriber wiring system of a residence. In use, it is the electrical service meter (not shown in FIG. 5) that provides the electrical path between the first electrical contacts 70 and the second electrical contacts 74. As shown in FIG. 5, in this embodiment a second electrical circuit 76 is provided that interconnects the first electrical contacts 70 with respective ones of the second electrical contacts 74 via a single throw, double pole switch 36. As described below, the switch 36 is used during a training session to simulate various situations that may be encountered. The service fixture 18 and the switch 42 of FIG. 4 are connected in the same manner as the service fixture 16 and the switch 36 of FIG. 5.

Figure 6:
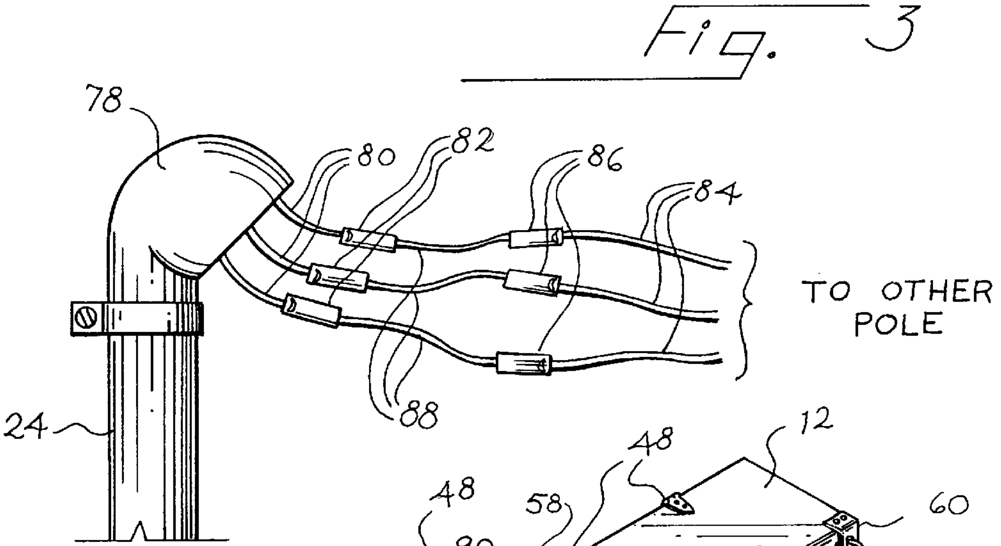
FIG. 6 is a fragmentary elevational view of a portion of the service simulator of FIG. 1.

As shown in FIG. 6, the upper end of one of the poles 24 includes a service entrance pipe weatherhead 78, and three cables emerge from the weatherhead 78 and extend to the opposite pole (not shown in FIG. 6). Each of these three cables includes a first cable length 80 that extends from the weatherhead 78 to a first mounting fixture 82, and a second cable length 84 that extends to the other pole and supports a second mounting fixture 86. In addition, each of the cables includes a third cable length that is removably positioned between the respective first and second mounting fixtures 82, 86. By way of example, each of the mounting fixtures 82, 86 may be of the type sold under the trade name INSULINK. Such a mounting fixture includes a tubular conductor that can be crimped to securely hold it to the respective first or second cable length 80, 84. The other or inner end of each of the mounting fixtures 82, 86 may be left uncrimped or partially crimped to allow ready removal and replacement of the third cable length 88 between training sessions.

Figure 7:
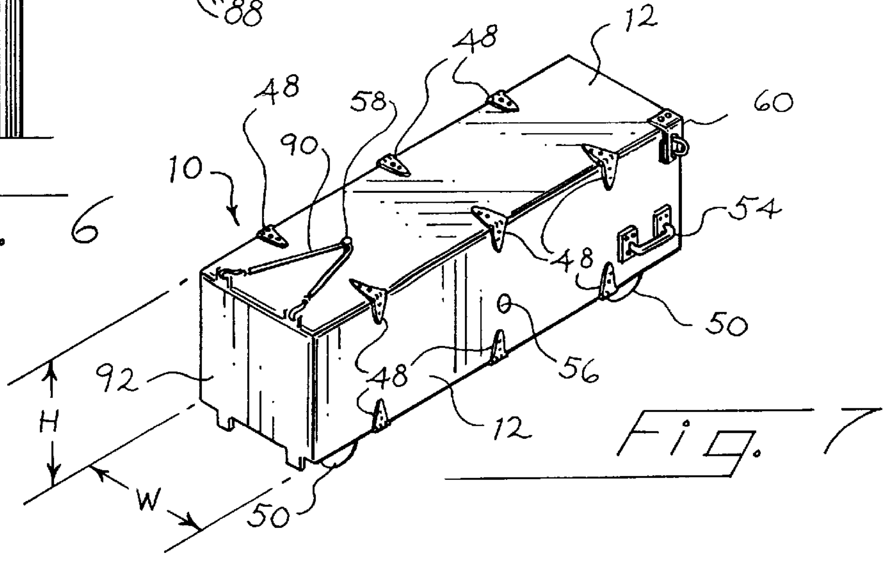
FIG. 7 is a perspective view of the service simulator of FIG. 1 in a storage or transport position.

FIG. 7 shows the simulator 10 folded to a storage or transport position. In this position the four panels 12 have been folded along hinge axes defined by the hinges 48 to form a rectangle, and the panels 12 are held in this rectangular configuration by the locking hasp 60. As shown in FIG. 7, in the transport or storage position the handles 54 allow the simulator to be grasped and transported easily, and the wheels 50 facilitate such transport. In this embodiment, the simulator 10 also includes a cover 92 that fits over one end of the folded simulator 10 and is held in place by elastic straps 90 extending between tabs on the cover 92 and the latches 58.

In use, the simulator 10 is typically folded to the configuration shown in FIG. 7 and then transported by truck or van to the training site. In this embodiment the height H and the width W of the folded simulator are both 34 inches, and the length of the folded simulator is about 66 inches. Thus, the service simulator 10 is sized for transport in a small van.

Once at the training site, the cover 92 is removed by removing the elastic straps 90, and the service simulator is placed in the upright position. Then the locking hasp 60 is opened and the panels 12 are unfolded to the operational position of FIG. 1. The bases 28 are placed around the ends of the service simulator 10 to provide increased stability, and then the poles 24 are installed on the bases 28 and secured to the panels 12 by means of the straps 26 and threaded fasteners. Preferably, each of the poles 24 in its fully assembled state has a length of about 10 feet, and a fitting is provided at a midpoint such that each of the poles can be divided into two lengths, each less than 70 inches in length.

Once the service simulator has been placed in the operational position, the power supply 22 can then be connected to the service fixtures 16, 18 via cables plugged into the electrical sockets 56, and the power supply 22 can itself be plugged into a conventional 120 volt AC outlet. This completes installation of the service simulator 10.

After trainees have received classroom instruction, they can then be trained on the service simulator 10. The service simulator 10 provides a realistic depiction of actual service hardware that a trainee may encounter in the field. For example, the trainee can practice removing the electrical service meters included in the service fixtures 14, 16 and 18 to familiarize himself or herself with the mechanical techniques required to remove an electrical meter. Once an electrical meter such as that included in the service fixtures 16 and 18 has been removed, the trainee can then use a low voltage tester to test that the electrical voltage across the first contacts 70 is characteristic of a single phase residential electrical service. Next, the trainee can use the low voltage tester to measure the voltage on the second pair of contacts 74. In a conventional residence, removing the electrical meter should remove all power from the second electrical contacts 74 and the associated subscriber wiring system. However, in certain unusual situations, removal of the electrical meter may not depower the subscriber wiring system.

This portion of a training session can be made realistic by use of the switches 36, 42 shown in FIG. 5. The instructor may close the switch 36, 42 to provide electrical power to the second contacts 74, even after the associated electric service meter has been removed. Alternatively, the instructor can open the switch 36, 42 to simulate a conventional residence, in which the second contacts 74 are depowered after the electric meter has been removed. The lamp 40 is connected to the second contacts 74 of the meter base included in the service fixture 18. Thus, when the meter is removed the trainee can see that the lamp 40 is extinguished.

Finally, the service fixture 20 is provided as an example of a type of electrical meter that is not suitable for disconnection by fire-fighting personnel.

The training session preferably also includes training in techniques for cutting overhead service cables. Preferably, such overhead service cables are cut in a prescribed order, with the neutral conductor being cut last. The trainee can use an insulated lever-type cutter to cut the three cable lengths 88 in the preferred order. Once this has been done, the instructor can readily replace the severed three cable lengths 88 with fresh, unsevered cable lengths simply by removing and replacing the severed cable lengths from the mounting fixtures 82, 86.

At the conclusion of training demonstrations, the service simulator 10 can readily be returned to the original storage position by removing the poles 24 and the bases 28, and then folding the panels 12 to the rectangular configuration. Then the locking hasp 60 is closed, the service simulator 10 is placed on the wheels 50, and the cover 92 is installed with the elastic straps 90.

Simply by way of example, the following detailed constructional information is provided in order to clarify the structure of the presently preferred embodiment. This detail is intended only by way of illustration, and is not intended to limit the scope of the following claims in any way. In this embodiment the panels 12 are formed of ¾ inch plywood, and the poles 24 are formed of 1¼ inch aluminum pipe. The cover 92 is formed of ⅛ inch aluminum. The safety switch 66 is fused for a 0.8 amps, and standard materials such as cables, meters, meter housings and the like are used for the simulated items of electrical service.

Of course, it should be understood that a wide range of changes and modifications can be made to the preferred embodiment described above. For example, a greater or lesser number of panels can be used, and they can fold to other shapes including triangular shapes. When four panels are used, they can fold into rectangles that are square as described above or rectangles that are elongated along one dimension. The number of service fixtures that are provided can be varied to suit the application, and one or more of the service fixtures may be powered. Details of construction including the specific service fixtures included in the simulator and the manner in which they are powered can all be adapted as suitable for the particular application. It is not required in all embodiments that the simulator include overhead cable service simulation, or that switches be provided for the second or output contacts of a meter base. The electrical supply system can be modified to suit the application; for example, in some cases the electrical supply system can include a power cord, and either or both of the transformer and the fused safety switch can be eliminated.

It should be apparent from the foregoing description that an improved electrical service simulator has been described that is easily portable and that provides a realistic simulation of residential electric services. This description has explained only a few of the many forms that this invention can take. For this reason, it is intended that the foregoing detailed description be regarded as an illustration rather than as a limitation of the invention. It is only the following claims, including all equivalents, that are intended to define the scope of this invention.

I claim:

1. An electrical service simulator comprising:

a plurality of interconnected panels, said panels movable between a storage position and an operational position, said panels spaced more closely in the storage position than in the operational position;

a plurality of electrical service fixtures, each fixture mounted on a respective one of the panels, at least some of the fixtures comprising respective electrical service meters;

an electrical supply system connected to at least a first one of the fixtures to power the first fixture during a training exercise;

wherein the panels comprise first and second panels comprising first and second front surfaces, respectively, that face in a common direction when the panels are in the operational position;

wherein the fixtures comprise at least one first fixture mounted on the first front surface and at least one second fixture mounted on the second front surface;

wherein the panels are configured to stand in an upright configuration in the operational position.

2. The invention of claim 1 wherein the plurality of panels comprises four panels foldable to a rectangular configuration, and wherein said fixtures face inwardly when the panels are in the rectangular configuration.

3. The invention of claim 2 further comprising a plurality of wheels mounted to an exterior portion of one of the panels to facilitate transportation of the simulator in the rectangular configuration.

4. The invention of claim 2 further comprising at least one handle mounted to an exterior portion of one of the panels to facilitate transportation of the simulator in the rectangular configuration.

5. The invention of claim 1 wherein the fixtures comprise fixtures selected from the group consisting of: a ring-type electrical meter, an A-base meter cabinet, and an underground cable meter cabinet.

6. The invention of claim 2 wherein the rectangular configuration has a height H and a width W, and wherein both H and W are no greater than about four feet.

7. The invention of claim 1 further comprising a plurality of hinges interconnecting the panels.

8. The invention of claim 1 further comprising a plurality of bases removably coupled with the panels to provide increased stability to the panels when standing in the operational position.

9. An electrical service simulator comprising:

a plurality of interconnected panels, said panels movable between a storage position and an operational position, said panels spaced more closely in the storage position than in the operational position;

a plurality of electrical service fixtures, each fixture mounted on a respective one of the panels, at least some of the fixtures comprising respective electrical service meters;

an electrical supply system connected to at least a first one of the fixtures to power the first fixture during a training exercise;

two vertically oriented poles removably mounted to respective ones of the panels; and a plurality of electrical cables extending between the poles above the panels.

10. The invention of claim 9 wherein each of the electrical cables comprises:

first and second cable lengths secured to the first and second poles, respectively;

first and second mounting fixtures secured to the first and second cable lengths, respectively; and a third cable length replaceably held in the first and second mounting fixtures to extend between the first and second cable lengths.

11. An electrical service simulator comprising:

a plurality of interconnected panels, said panels movable between a storage position and an operational position, said panels spaced more closely in the storage position than in the operational position;

a plurality of electrical service fixtures, each fixture mounted on a respective one of the panels, at least some of the fixtures comprising respective electrical service meters;

an electrical supply system connected to at least a first one of the fixtures, to power the first fixture during a training exercise;

wherein the electrical supply system comprises at least one fused switch connected in series with at least some of the service fixtures.

12. An electrical service simulator comprising:

a plurality of interconnected panels, said panels movable between a storage position and an operational position, said panels spaced more closely in the storage position than in the operational position;

a plurality of electrical service fixtures, each fixture mounted on a respective one of the panels, at least some of the fixtures comprising respective electrical service meters;

an electrical supply system connected to at least a first one of the fixture, to power the first fixture during a training exercise;

wherein at least one of the fixtures comprises an electrical meter base comprising a first pair of contacts adapted to supply electrical power to an associated electric meter and a second pair of contacts adapted to supply electrical power from the associated electric meter to an associated subscriber wiring system.

13. The invention of claim 12 wherein the electrical supply system comprises:

a first circuit connected to the first pair of contacts to power the first pair of contacts during the training exercise; and a second circuit connected to the second pair of contacts to power the second pair of contacts during the training exercise.

14. The invention of claim 13 wherein the second circuit comprises a switch operative to selectively remove power from the second pair of contacts during the training exercise.

15. An electrical service simulator comprising:

(a) a plurality of interconnected panels, said panels movable between a storage position and an operational position, said panels arranged in a rectangular configuration in the storage position;

(b) a plurality of hinges mounted on each panel to interconnect the panels;

(c) a plurality of wheels mounted to an exterior portion of a first of one of the panels to facilitate transportation of the simulator in the rectangular configuration;

(d) at least one handle mounted to an exterior portion of a second one of the panels to facilitate transportation of the simulator in the rectangular configuration;

(e) a plurality of electrical meter bases mounted to interior portions of the panels, said electrical meter bases comprising a first electrical meter base comprising a first pair of contacts and a second pair of contacts;

(f) a plurality of electrical meters, each meter mounted on a respective one of the electrical meter bases, at least one of said meters connected to the first pair of contacts to receive electrical power and connected to the second pair of contacts to supply electrical power to an associated subscriber wiring system, wherein said meters face inwardly when the panels are in the rectangular configuration;

(g) a power supply mounted in a separate enclosure to provide power to at least some of the electrical meter bases; and (h) a first circuit connected between the power supply and the first pair of contacts to power the first pair of contacts during a training exercise; and a second circuit connected between the power supply and the second pair of contacts to power the second pair of contacts during the training exercise.

* * * * *